United States Patent Office 3,224,483
Patented Dec. 21, 1965

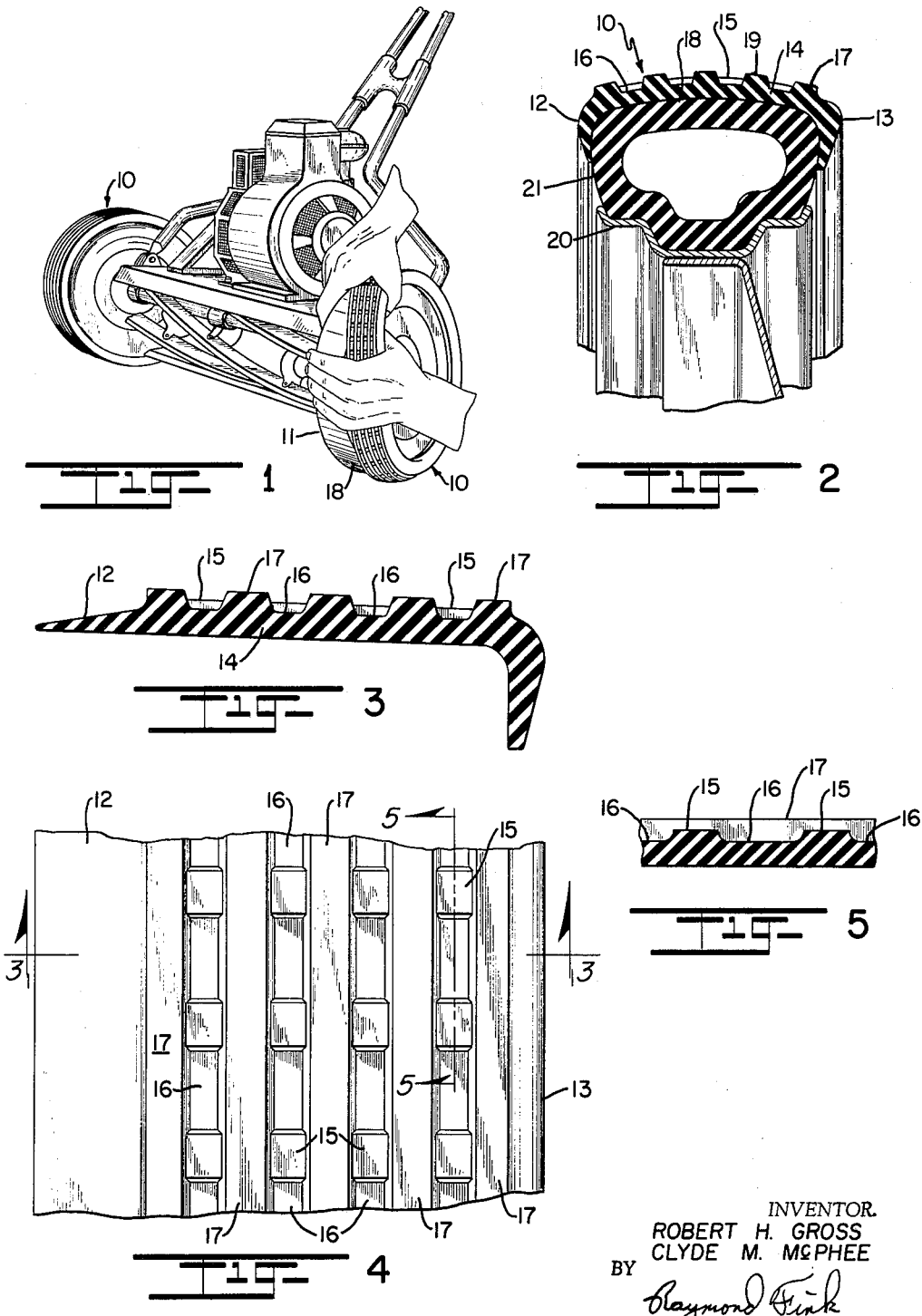

3,224,483
TIRE TREAD
Robert H. Gross, Denver, and Clyde M. McPhee, Littleton, Colo., assignors to The Gates Rubber Company, Denver, Colo., a corporation of Colorado
Filed July 24, 1964, Ser. No. 385,007
4 Claims. (Cl. 152—187)

This invention relates to a tire and more particularly to a tire tread for replacing the worn-out tread portion on tires commonly used on small wheeled equipment, such as lawn mowers, lawn sweepers, carts, small tractors, tricycles, wagons, scooters, baby strollers and other similar type of equipment.

One of the principal objects of this invention is to provide a tire tread to replace the worn-out tread traction surface of a used tire on which the traction design has been obliterated.

Another object of this invention is to provide a tire for small wheeled equipment which can easily be installed on a worn-out vehicle tire without the need for any special tools or equipment.

Still another object of this invention is to provide a universally fitting tire which will easily conform to a large variety of tire sizes commonly found on such small wheeled equipment and which will conform to the shape of the worn-out tire.

A further object is to provide a universally fitting tire which can be slipped over the worn tread surface of a variety of tire sizes.

A further object is to provide a tire with a traction surface to replace the worn tread surface of an original tire and thereby renew the traction qualities of the worn tire.

Another object of this invention is to provide a traction surface for worn-out tires of small wheeled equipment which can be installed on the wheel without removing the worn-out tire.

Additional objects and advantages will become apparent from the following description and accompanying drawings wherein:

FIGURE 1 is a schematic view of the method of installing the invention and utilization of the invention on the lawn mower;

FIGURE 2 is a cross section view of the tire tread as embodied by this invention as it is applied to a worn tire;

FIGURE 3 is a cross section view along the plane 3—3 of FIGURE 4 of the tire before installation on a wheel and showing the adaptability of the tire to fit various tire sizes;

FIGURE 4 is an elevation view of the tire showing the traction surface and the conforming sidewall of the tire tread before installation on a tire; and FIGURE 5 is a section along the plane 5—5 of FIGURE 4 showing the traction elements of the tire tread.

Referring more specifically to the drawings, FIGURE 3 shows the tire 10 as embodied by this invention before it is installed on a worn tire 11 of a small wheeled vehicle. The tire 10 has two sidewall portions 12 and 13. Sidewall 12 consists of an extension of the annular body portion 14 containing the tread surface 19 of the tire. In its cross section the sidewall 12 defines a tapered configuration. The other sidewall 13 has a shape which more or less conforms to the conventional sidewall configuration of the original tire. In other words, sidewall 13 is a curved continuation of the annular body portion 14 and at its lower extremity is essentially perpendicular to the plane of the body 14. The mid body portion 14 contains a conventional tread surface 19 consisting of design elements having elevated tread elements 15 and depressed elements 16. The tread design conventionally consists of circumferentially extending alternate elevated elements 15 and depressed elements 16 and are laterally separated by rib sections 17.

The mid body portion 14 contains the flat tread surface 19 of the tire which provides traction of the wheel against the surface over which the wheel is being driven. The tread surface 19 of the tire generally has a slight radius of curvature extending laterally across the tread surface. Even though in the uninstalled position the tread surface of the present invention is flat, said surface will assume the same configuration of curvature of the worn tire because of the flexibility of the material from which the tread surface is constructed. The various traction elements 15 and 16 will provide renewed traction elements with which to grip the ground surface and essentially will replace the worn surface 18 of the tire 11 over which the tread is to be applied. The tread tire 10 is designed to be slipped over the worn vehicle tire 11 and will completely embody the worn tire 11 as shown in FIGURE 2. As will subsequently be explained, the tire tread 10 is manufactured from a flexible elastomer such as rubber and when applied to the worn tire 11, will conform to the shape of the worn tire.

It has been found that if one molds the tire tread 10 to a diameter somewhat less than the commonly occurring original tire diameters, the stretched condition of the tire tread 10 as it is placed on the worn tire will induce the tire tread to conform to the contour of the worn tire. Thus, it has been found that a tire tread having an inner diameter of 8 5/16 inches will easily fit a normal wheel size having a diameter of from 8½ to 11 inches. It will be clearly seen that the tire tread is placed in a stretched condition when placed on a worn tire having a larger diameter than the molded diameter of the tire tread.

In addition, given a lateral traction surface of 1 5/8 inches, a tire tread as embodied by this invention will fit a mower wheel having a tread width of up to 1 7/8 inches. This dimension, however, is not critical. The reason that the lateral length of the body portion 14 is not critical is that the tapered edge 12 will easily conform to the inner sidewall of the wheel over which it is placed. This can more easily be seen by referring to FIGURE 2 which shows a worn tire 11 on a wheel 20, together with the tire tread 10 placed upon it. In its original molded shape the tapered edge 12 of the tire extends in a plane continuous with the plane presented by the annular portion 14 of the tire. However, because of the fact that the tire is then put into a stretched condition when it is placed upon the worn vehicle tire, the thinner tapered edge 12 conforms to the sidewall 21 of the worn tire.

The fact that the tire conforms to the worn tire over which it is placed is due to the fact that the tire is made of a high quality rubber compound having a moderate modulus but with a high elasticity. Thus, if one stretches the tire out, the thinner portions bearing the higher tensile stress concentrations will tend to stretch at a rate different from the thicker portion. The thicker sidewall 13 and the body portion 14 of the tire therefore tend to maintain their molded shape while the thinner portion 12 will tend to conform to the configuration of the tire portion over which it is placed.

The above explanation indicates why the tire of this design tends to be more or less of a universal type tread replacement. Rather than have a different diameter for the various sized vehicle wheels of from 8½ to 11 inches in diameter, one size tire tread 10 will fit all the original various sizes. All portions of the tread can be stretched. Thus, even though the diameter of the tire tread is 8 5/16 inches in diameter, it can be stretched out to accommodate a tire 11 inches in diameter. The molded sidewall 13 is already shaped to conform to the sidewall 21 of the worn tire over which it is being placed. The tapered edge 12 will tend to conform to the shape of the surface over which it is placed and will therefore more or less form its own sidewall shape regardless of the diameter of the worn wheel over which it is being placed.

One of the common difficulties with the worn power mower tires is that because the traction design has been obliterated, the driven wheel will tend to slip, especially on a surface such as fresh green grass. The tread surface 19, however, of the tire tread provides renewed traction between the tire tread and the ground surface. In order to preclude the possibility of the tire tread slipping on the worn tire, it has been found desirable to somehow adhere the inner surface of the tire tread to the worn surface 18 of the vehicle tire. This can be accomplished in a number of ways. The most satisfactory way, however, has been found to simply adhere the surfaces together with a suitable rubber cement. It has been found helpful first to clean the worn surface of the vehicle tire by means of a solvent such as the mower gasoline.

Other methods, however, are satisfactory for adhering the two surfaces to each other. Therefore, one can insert barbed plates between the tire tread and the worn tire surface. If the surface of the plate is barbed toward both the carcass tread surface and the inner diameter surface of the retread tire, the plate will be unable to slip either against the worn tire surface or the inner surface of the tire tread. Generally speaking, however, the actual adhesion by means of cement has been found to be somewhat more satisfactory.

One of the additional advantages of the tire tread is that it too may be used until it is worn out. It can then be easily removed and replaced by a new tire tread. The original worn tire has been maintained so that it once again may provide the carcass structure for a new tread tire.

Having thus described the invention with particular reference to a preferred embodiment, it is obvious that thorough understanding of the invention will enable those skilled in the art to adapt various changes and other modifications in conjunction therewith without departing from the spirit and scope of the invention as defined by the claims appended hereto.

What is claimed is:

1. A tire tread portion comprising a solid preformed annular flexible elastomer body portion having a plurality of circumferentially extending traction elements, a first sidewall portion joined integrally to one lateral edge of said body portion and extending radially inward from said body portion and having a thicker cross section immediately adjacent to the portion attached to said body portion, a second sidewall integrally attached to the other lateral edge of said body portion, said second sidewall having a tapered cross section being thicker at the portion integrally joined to the body portion and tapering to a thin outer portion said second sidewall portion extending transversely outward from said body portion in an unstressed condition but extending radially inward when placed in a tensioned stressed condition.

2. In combination with a worn tire a tread element comprising a solid annular flexible elastomer body portion having a normal inner diameter less than the diameter of said worn tire having tread elements extending circumferentially around the outer surface of said annular body portion, a first sidewall joined at one lateral edge of said body portion having a thicker portion immediately adjacent said adjoining portion and extending radially inward from said portion, a second tapered sidewall joined integrally to the other lateral edge of said body portion and having a cross section which is convergent toward the outer edge of second sidewall such that said second sidewall extends in an axial direction when said tread portion is in an unstressed condition and extends radially inward when said tread portion is put in a tensioned stressed condition with said second sidewall generally conforming to the shoulder and sidewall portion of the worn implement tire.

3. In combination with a worn implement tire a tread portion comprising an outer annular body portion adhered to the radially outward worn portion of the implement tire, a first sidewall portion joined integrally to the outer tread portion and extending radially inward from the annular tread portion and having a laterally outward extending scuff resistant thick portion, a second tapered sidewall having a cross section which is convergent toward the outer edge of second sidewall and adjoining the other lateral edge of said tread body portion, said second sidewall being in a stressed condition and generally conforming to the shoulder and sidewall portion of the worn implement tire.

4. In combination with a worn tire a retread tire comprising an annular body portion having a normal inner diameter less than the diameter of said worn tire, and a tread portion on the outer circumference of said annular body portion comprising a plurality of tread elements extending circumferentially around said annular body portion, a first sidewall portion joined integrally to one lateral edge of said body portion and extending substantially perpendicular from said body portion said first sidewall portion having a thicker cross section immediately adjacent to the portion attached to said body portion, a second tapered sidewall portion joined integrally to the other lateral edge of said body portion and convergently extending substantially perpendicular to said body portion, said second sidewall generally conforming to the shoulder and sidewall portion of the worn tire when said body portion is stretched such that the inner diameter of the body portion equals the outer diameter of the worn tire.

References Cited by the Examiner

UNITED STATES PATENTS

| | | | |
|---|---|---|---|
| 1,989,402 | 1/1935 | Cupp | 152—187 X |
| 2,961,025 | 11/1960 | White | 152—187 |
| 3,004,577 | 10/1961 | Morse | 152—175 |

EUGENE G. BOTZ, *Primary Examiner.*

ARTHUR L. LA POINT, *Examiner.*

C. W. HAEFELE, *Assistant Examiner.*